US010296042B2

(12) United States Patent
Seuntjens

(10) Patent No.: US 10,296,042 B2
(45) Date of Patent: May 21, 2019

(54) DISPLAY ASSEMBLY

(71) Applicant: CHRISTAL CLEAR SHOWCASES, LLC, Ankeny, IA (US)

(72) Inventor: Christopher Seuntjens, Ankeny, IA (US)

(73) Assignee: Christal Clear Showcases, LLC, Ankeny, IA (US)

( * ) Notice: Subject to any disclaimer, the term of this patent is extended or adjusted under 35 U.S.C. 154(b) by 0 days.

(21) Appl. No.: 15/905,260

(22) Filed: Feb. 26, 2018

(65) Prior Publication Data
US 2018/0246541 A1  Aug. 30, 2018

Related U.S. Application Data

(60) Provisional application No. 62/463,123, filed on Feb. 24, 2017.

(51) Int. Cl.
| | | |
|---|---|---|
| A47F 3/00 | (2006.01) | |
| A47F 3/14 | (2006.01) | |
| G06F 1/16 | (2006.01) | |
| G09G 3/20 | (2006.01) | |
| G02F 1/1333 | (2006.01) | |

(52) U.S. Cl.
CPC ............ *G06F 1/1601* (2013.01); *A47F 3/145* (2013.01); *G09G 3/20* (2013.01); *A47F 3/004* (2013.01); *G02F 1/133308* (2013.01); *G06F 1/1637* (2013.01)

(58) Field of Classification Search
CPC . G06F 1/1637; G06F 1/1601; G02F 1/133308
See application file for complete search history.

(56) References Cited

U.S. PATENT DOCUMENTS

| | | | | |
|---|---|---|---|---|
| 6,507,484 B2 * | 1/2003 | Fukuyoshi | ........ | G02F 1/133308 345/156 |
| 8,284,343 B2 * | 10/2012 | Koike | ............... | G02F 1/133308 349/56 |
| 8,437,120 B2 * | 5/2013 | Lee | ........................ | H05K 5/0217 361/679.01 |
| 8,964,367 B2 * | 2/2015 | Nonaka | ..................... | H04N 5/64 248/309.1 |
| 2002/0015284 A1 * | 2/2002 | Howell | ................. | G06F 1/1616 361/679.58 |
| 2006/0138296 A1 * | 6/2006 | Deluga | ................. | G06F 1/1601 248/346.01 |
| 2007/0120878 A1 * | 5/2007 | Hsiao | .................... | G06F 1/1601 345/156 |
| 2009/0059115 A1 * | 3/2009 | Asano | ............... | G02F 1/133308 349/60 |
| 2012/0314155 A1 * | 12/2012 | Lo | ........................ | G06F 1/1637 349/58 |

* cited by examiner

*Primary Examiner* — Nidhi Thaker
(74) *Attorney, Agent, or Firm* — Zarley Law Firm, P.L.C.

(57) ABSTRACT

A display assembly having a top member connected to a bottom member. The top member has a top wall, sidewalls, and a flange having an outer edge that extends outwardly from the sidewalls. The bottom member has a bottom wall, sidewalls, a flange that extends outwardly from the sidewall, and an outer ridge on the flange that extends toward the top member.

10 Claims, 4 Drawing Sheets

DISPLAY ASSEMBLY

CROSS REFERENCE TO RELATED APPLICATION

This application claims the benefit of U.S. Provisional Application No. 62/463,123 filed Feb. 24, 2017.

BACKGROUND OF THE INVENTION

This invention is directed to a display assembly and more particularly a display assembly that improves upon conventional display assemblies.

Display assemblies are well known in the art for use in displaying merchandise such as coins, stamps, jewelry, and the like. Existing display assemblies are heavy, take up a lot of space, take time to assemble and breakdown, and are difficult to handle. Therefore, a need exists in the art for a display assembly that addresses these needs.

An objective of the present invention is to provide a display assembly that is lightweight and takes up a minimum amount of space.

Another objective of the present invention is to provide a display assembly that is easy to assemble, break down, and handle.

These and other objectives will be apparent to those skilled in the art based upon the following written description, drawings and claims.

SUMMARY OF THE INVENTION

A display member has a top member connected to a bottom member. The top member has a top wall, sidewalls, and a flange that extends outwardly from the sidewalls to an outer edge. Extending outwardly from the outer edge on opposite sides is at least one connecting tab and at least one locking tab.

The bottom member has a bottom wall, sidewalls, and a flange that extends outwardly from the sidewalls to an upwardly extending outer ridge. The flange of the top member nests within the outer ridge of the bottom member and is supported by the flange on the bottom member.

On one side of the bottom member the outer ridge is interrupted to form at least one opening that aligns with and receives the at least one locking tab. On an opposite side the outer ridge has at least one slot that aligns with and receives the at least one connecting tab. The at least one locking tab has an aperature that receives a locking mechanism.

DETAILED DESCRIPTION

Figure 1:
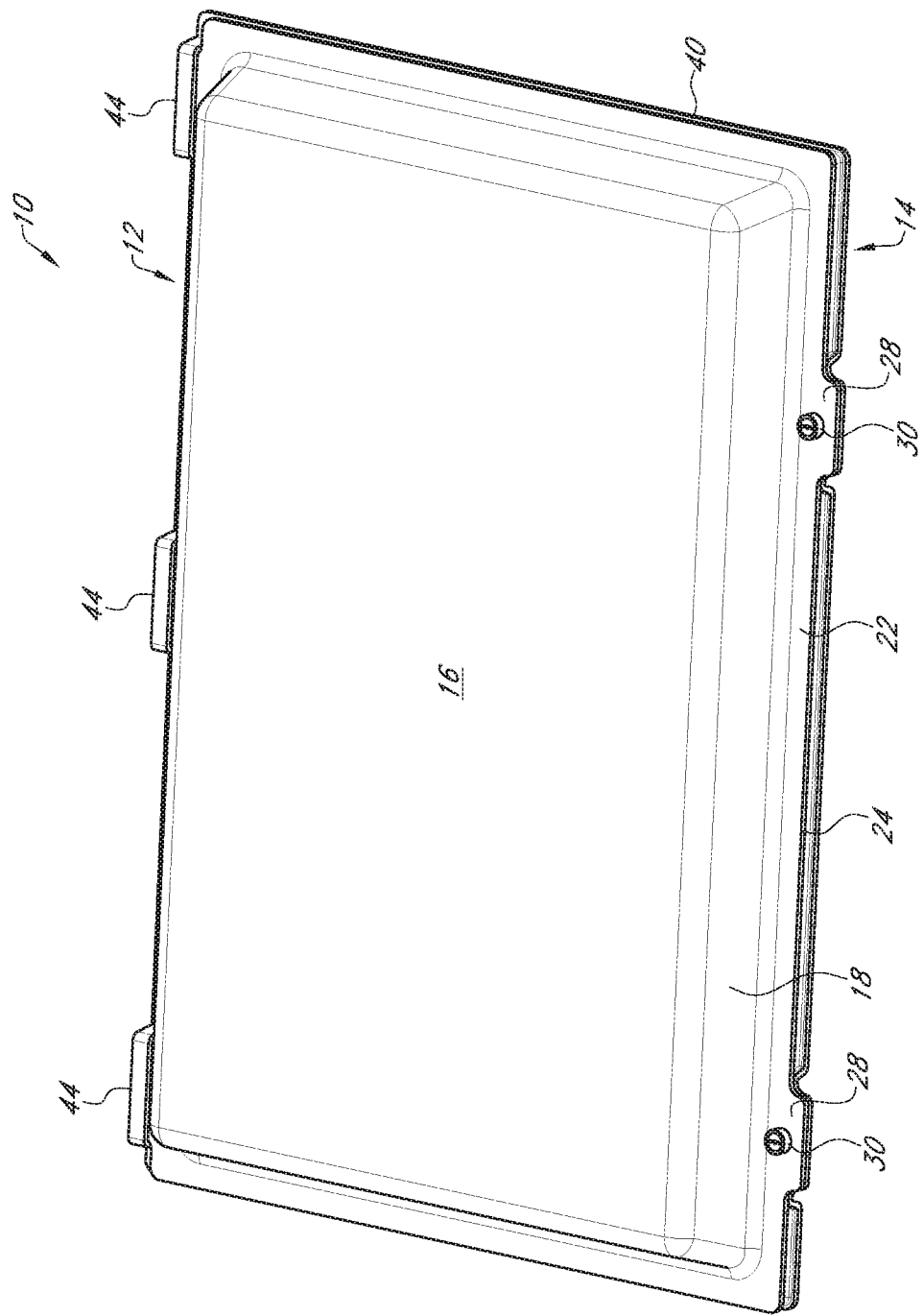
FIG. 1 is a top perspective view of a display assembly.
Figure 2:
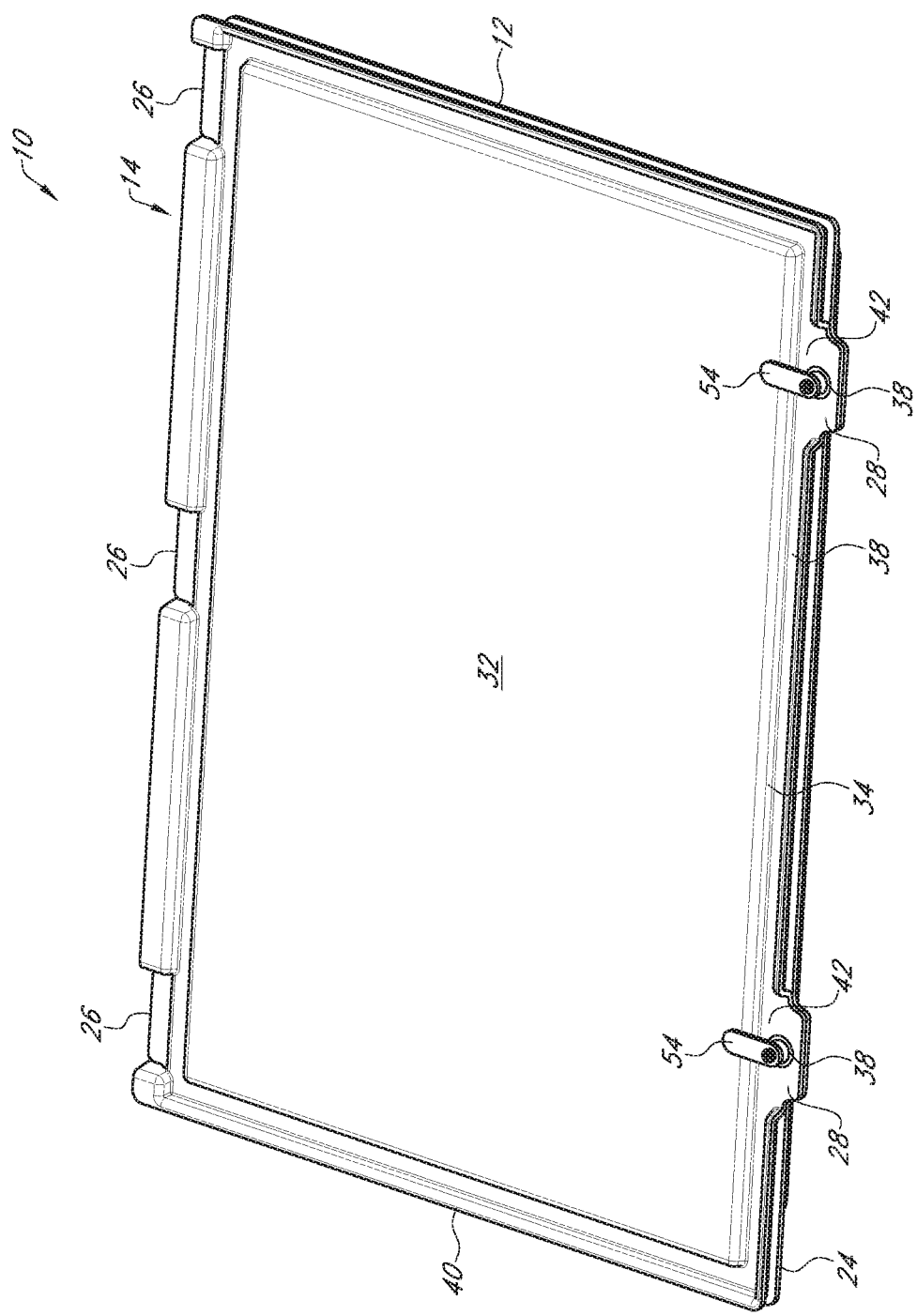
FIG. 2 is a bottom perspective view of a display assembly.
Figure 3:
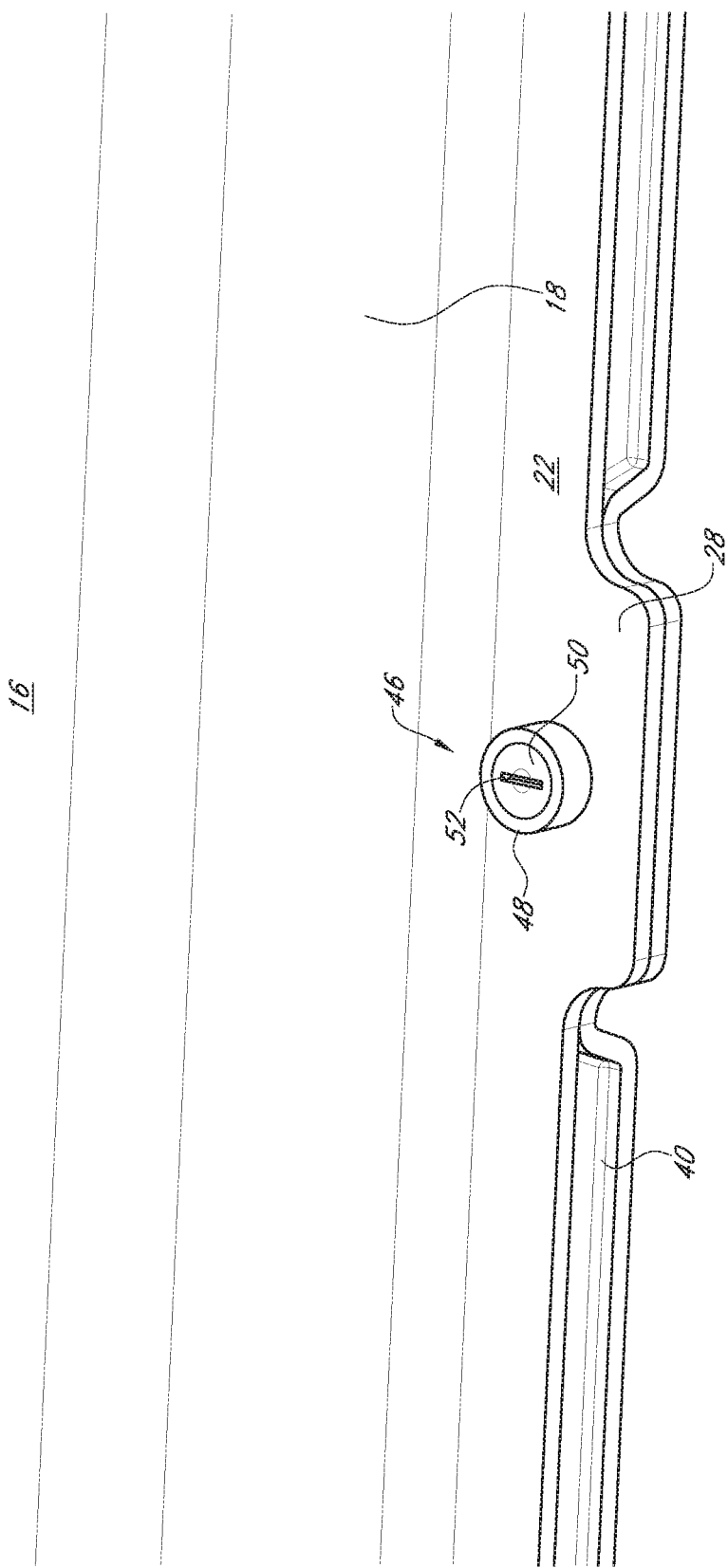
FIG. 3 is a top perspective view of a locking tab and locking mechanism.
Figure 4:
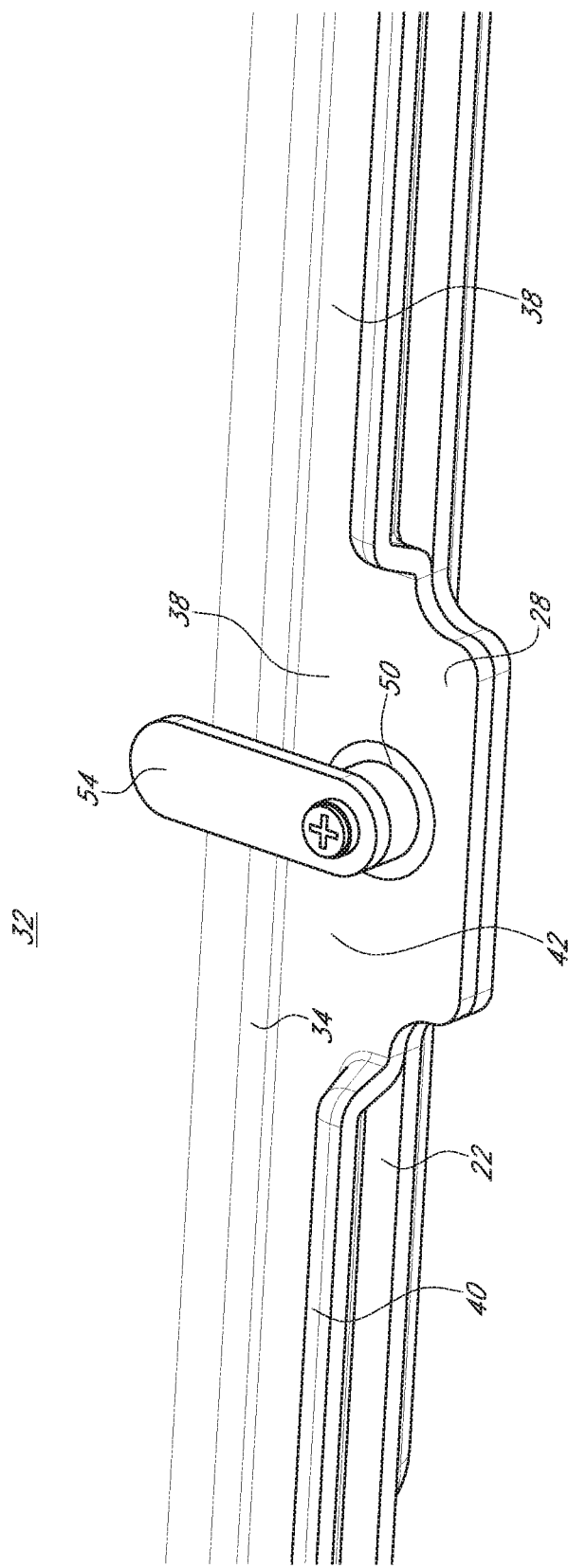
FIG. 4 is a bottom perspective view of a locking tab and locking mechanism.

Referring to the Figures, a display assembly 10 has a top member 12 and a bottom member 14 that are hingedly connected. The top member 12 has a top wall 16 and sidewalls 18 that form a compartment 20. In one embodiment, the sidewalls 18 angle outwardly from the top wall 16. The sidewalls 18 terminate in an outwardly extending flange 22 having an outer edge 24. Extending outwardly from the outer edge 24 on one side of the top member 12 is at least one, and preferably three connecting tabs 26. On the opposite side of the top member 12 and extending outwardly from the outer edge is a locking tab 28. The locking tab 28 has an opening or aperture 30.

The bottom member 14 has a bottom wall 32 and sidewalls 34 that form a compartment 36 that is generally aligned with compartment 20 of the top member 12. The sidewalls 34 terminate in outwardly extending flanges 38 that are positioned to align, engage and support flange 22 of the top member 12. Flange 38 terminates in an outer ridge 40 that extends toward the top member 12 such that flange 22 of the top member nests within the outer ridge 40.

On one side of the bottom member 14, the outer ridge 40 is interrupted to form an opening 42. The opening is positioned adjacent to locking tab 28 of the top member 12. Alternatively, there are two openings 42 that each align with a locking tab 28. On a side opposite opening 42, the outer ridge 40 has at least one and preferably three slots 44. The slots 44 are positioned to align with connecting tabs 26 and are formed to receive the connecting tabs 26 of the top member 12.

Extending through aperture 30 is a locking mechanism 46. The locking mechanism is of any size, shape, and structure. In a preferred embodiment the locking mechanism 46 has a head 48 having a diameter greater than the diameter of aperture 30. A locking shaft 50 is rotatably connected to and extends through the head 48 as well as aperture 30. The shaft 50 has a slot 52 at one end formed to receive a key. Attached to the opposite end of the locking shaft 50 is a locking arm 54.

In operation, to assemble, connecting tabs 26 of the top member 12 are aligned with slots 44 of the bottom member 14 and tabs 26 are slid into slots 44. Tabs 26 are of a pliable material or have a fold line that permit the top member 12 to be raised while still connected to the bottom member 14 in a hinged manner.

Next, the top member 12 is lowered so that flange 22 rests upon flange 38 and nests within outer ridge 40. To lock the assembly, a key is inserted into slot 52 and shaft 50 is rotated. The rotation of shaft 50 also rotates locking arm 50 so that it engages a bottom surface of flange 38 at opening 42 of outer ridge 40. In this position, the top member 12 is locked to the bottom member. To unlock, using the key, the shaft 50 is rotated in the opposite direction causing locking arm 54 to rotate out of engagement with flange 38.

In addition, the top member 12 and bottom member 14 easily detach from one another. Once detached top member 12 can be stacked or nested within one another and bottom members 14 can be stacked or nested within one another to ease transport and save storage space when multiple cases are in use.

What is claimed is:
1. A display assembly, comprising:
    a top member having a top wall, a sidewall, and a flange that extends outwardly from the sidewall;
    a bottom member having a bottom wall and sidewalls connected to the top member;
    a flange that extends outwardly from the sidewalls of the bottom member that are positioned to align, engage, and support the flange of the top member; and
    an outer ridge on the flange of the bottom member that extends upwardly toward the top member away from the flange of the bottom member, and permits the flange of the top member to nest within the outer ridge, wherein the outer ridge on one side of the bottom member is interrupted to form at least one opening.

2. The display assembly of claim 1 wherein the top member has at least one locking tab that extends outwardly from the flange of the top member and aligns with the at least one opening in the outer ridge of the bottom member.

3. The display assembly of claim 2 wherein the at least one locking tab of the top member has an aperture that receives a locking mechanism.

4. The display assembly of claim 1 wherein opposite the one side of the bottom member has at least one slot.

5. The display assembly of claim 4 wherein the top member has at least one connecting tab that extends outwardly from the outer edge of the flange and is positioned to align with and be received within the slots of the bottom member.

6. The display assembly of claim 1 wherein the top member forms a first compartment and the bottom member forms a second compartment configured to display merchandise.

7. The display assembly of claim 1 wherein the top member is configured to stack within another top member.

8. The display assembly of claim 7 wherein the bottom member is configured to stack within another bottom member.

9. A display assembly, comprising:
a top member having a top wall and sidewalls;
a top flange extends around and outwardly from the sidewalls of the top member in substantially parallel-spaced alignment with the top wall;
a bottom member having a bottom wall and sidewalls;
a bottom flange extends around and outwardly from the sidewalls of the top member in substantially parallel-spaced alignment with the bottom wall;
an outer ridge extends upwardly from and perpendicularly to the bottom flange towards the top member;
wherein when the top member and the bottom member are assembled to each other, the top flange rests upon the bottom flange and within the outer ridge.

10. A display assembly, comprising:
a top member having a top wall, a sidewall, and a flange that extends outwardly from the sidewall; wherein the top wall extends the length and width between the sidewall;
a bottom member having a bottom wall and a sidewall connected to the top member, wherein the bottom wall extends the length and width between the sidewalls;
a flange that extends outwardly from the sidewalls of the bottom member that are positioned to align, engage, and support the flange of the top member; and
an outer ridge on the flange of the bottom member that extends toward the top member and permits the flange of the top member to nest within the outer ridge, wherein the outer ridge on one side of the bottom member is interrupted to form at least one opening.

* * * * *